Figure 1:
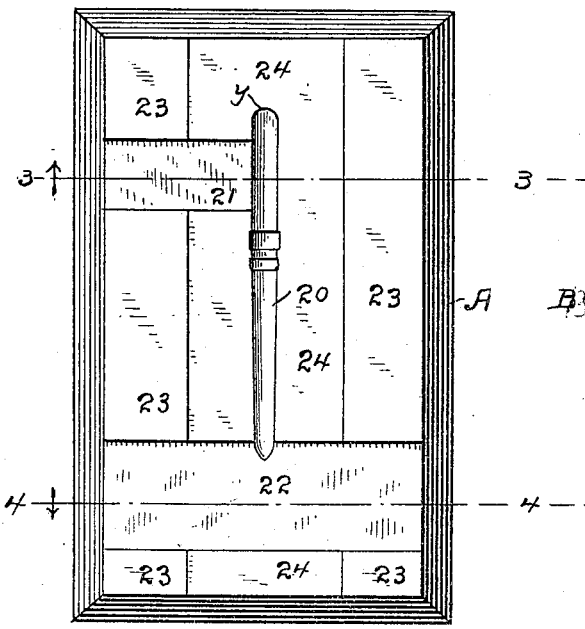

No. 774,241. PATENTED NOV. 8, 1904.
L. W. GATES.
DIES FOR MAKING KEYS OR SIMILAR ARTICLES.
APPLICATION FILED MAR. 12, 1903.
NO MODEL. 3 SHEETS—SHEET 1.

WITNESSES. INVENTOR.

No. 774,241. PATENTED NOV. 8, 1904.
L. W. GATES.
DIES FOR MAKING KEYS OR SIMILAR ARTICLES.
APPLICATION FILED MAR. 12, 1903.
NO MODEL. 3 SHEETS—SHEET 2.
Fig. 5.
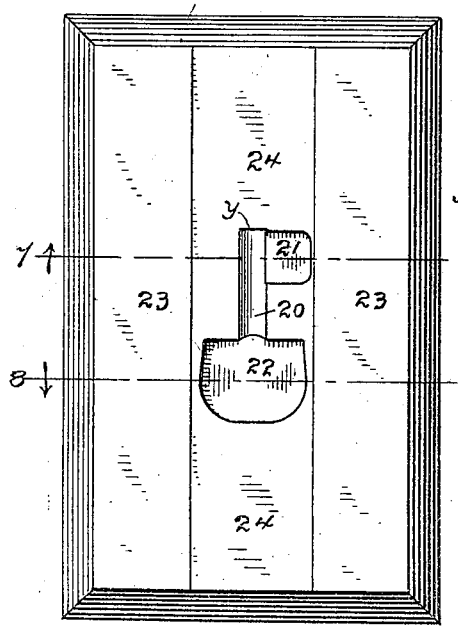
Fig. 6.
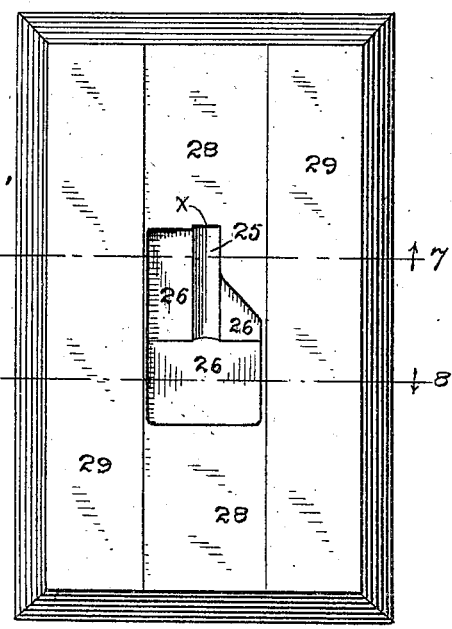
Fig. 7.
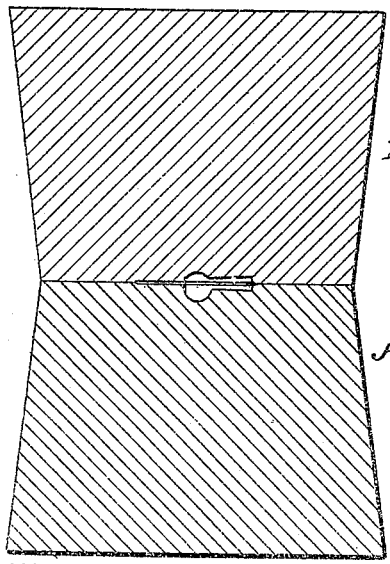
Fig. 8.
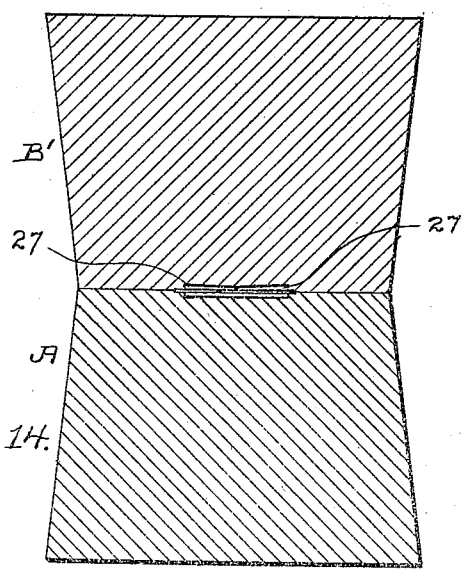
Fig. 14.
WITNESSES.
H. A. Lamb.
S. W. Atherton.
INVENTOR.
Louis W. Gates
By A. M. Wooster
Atty.

No. 774,241. PATENTED NOV. 8, 1904.
L. W. GATES.
DIES FOR MAKING KEYS OR SIMILAR ARTICLES.
APPLICATION FILED MAR. 12, 1903.
NO MODEL. 3 SHEETS—SHEET 3.

WITNESSES. INVENTOR.
H. A. Lamb. Louis W. Gates
S. W. Atherton. By A. M. Wooster
Atty.

No. 774,241. Patented November 8, 1904.

UNITED STATES PATENT OFFICE.

LOUIS W. GATES, OF WESTHAVEN, CONNECTICUT.

DIES FOR MAKING KEYS OR SIMILAR ARTICLES.

SPECIFICATION forming part of Letters Patent No. 774,241, dated November 8, 1904.

Application filed March 12, 1903. Serial No. 147,448. (No model.)

*To all whom it may concern:*

Be it known that I, LOUIS W. GATES, a citizen of the United States, residing at Westhaven, county of New Haven, State of Connecticut, have invented new and useful Dies for Making Keys or Similar Articles, of which the following is a specification.

My invention relates to the manufacture of cold-forged keys and similar articles, and has for its object to provide dies by which keys and metallic articles of similar character may be swaged from blanks of ordinary round wire.

With this end in view I have devised the novel dies which I will now describe, referring to the accompanying drawings, forming part of this specification, and using reference characters to designate the several parts, it being deemed sufficient for the purposes of this specification to illustrate only the application of the principle of my invention to dies for making keys.

Figure 2:
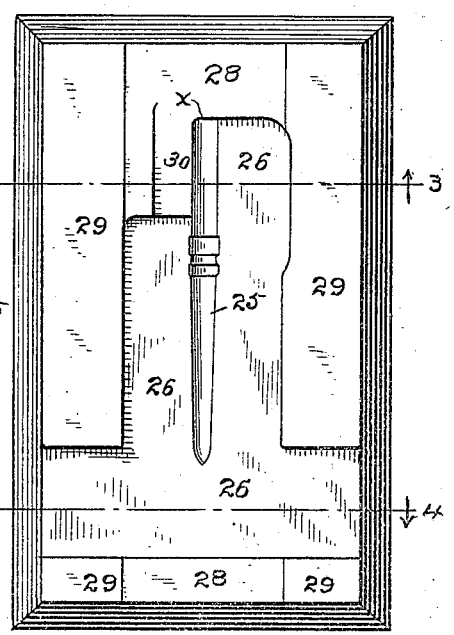
Figure 3:
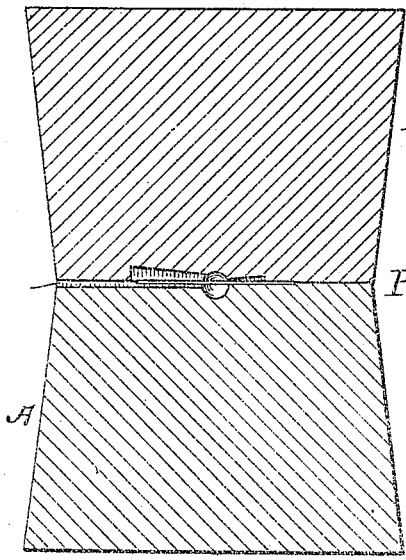
Figure 4:
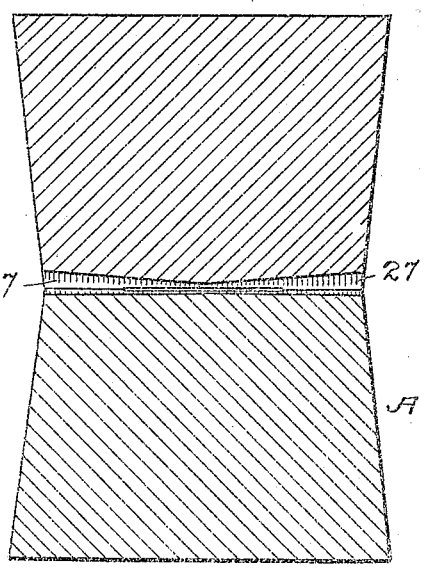
Figure 9:
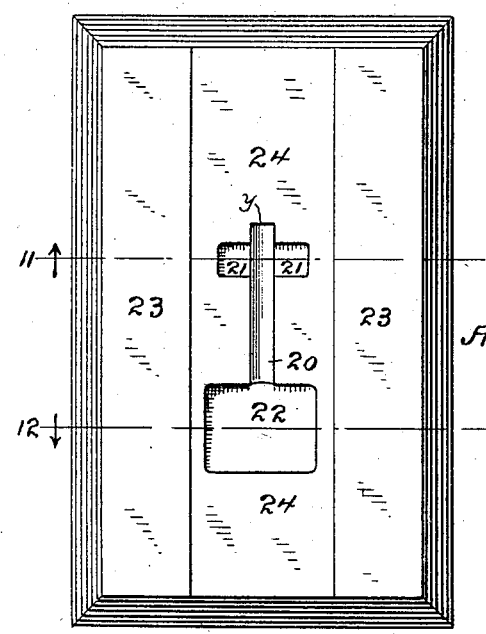
Figure 10:
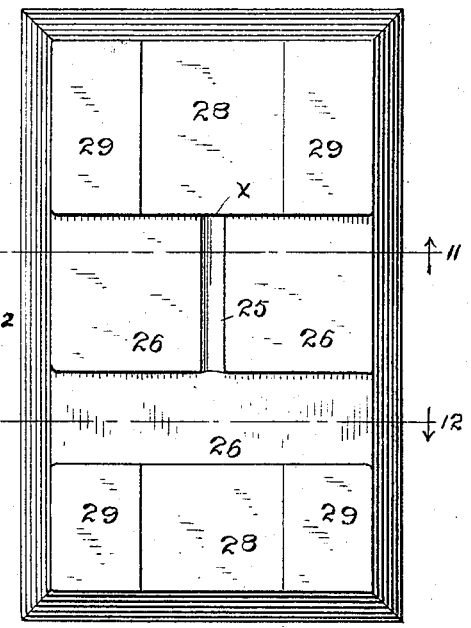
Figure 11:
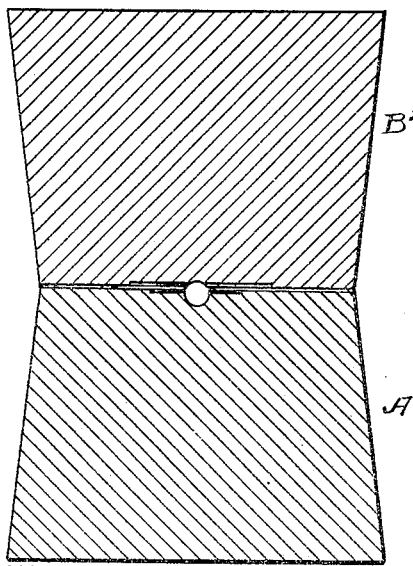
Figure 12:
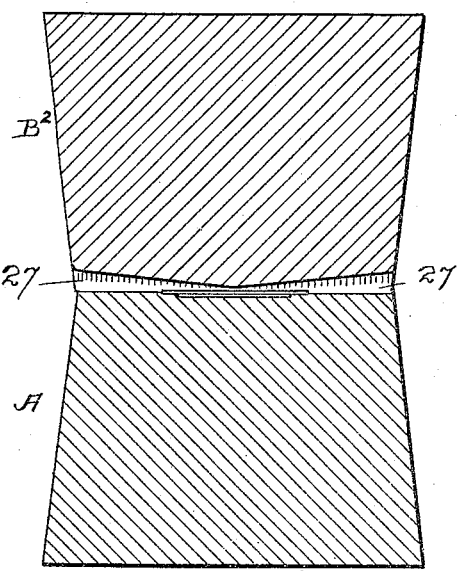

Figures 1, 5, and 9 are face views of slightly variant forms of lower dies embodying the principle of my invention. Figs. 2, 6, and 10 are face views of the coacting upper dies, it being understood, however, that the terms "upper" and "lower" are used for convenience only, as either die may be used as an upper die and a die coacting therewith under the principle of my invention may be used as a lower die. Fig. 3 is a transverse section of lower and upper dies on the line 3 3 in Figs. 1 and 2; Fig. 4, a transverse section of the same dies on the line 4 4 in Figs. 1 and 2; Fig. 7, a transverse section of lower and upper dies on the line 7 7 in Figs. 5 and 6; Fig. 8, a transverse section of the same dies on the line 8 8 in Figs. 5 and 6; Fig. 11, a transverse section of lower and upper dies on the line 11 11 in Figs. 9 and 10; Fig. 12, a transverse section of the same dies on the line 12 12 in Figs. 9 and 10; Fig. 13, an elevation of a blank upset laterally at one end to provide metal for a large single bit, this style of blank being preferably used with the style of dies illustrated in Figs. 1 to 4, inclusive; and Fig. 14 is an elevation of an ordinary straight round wire blank which is preferably used in making smaller-sized keys and with the styles of dies illustrated in Figs. 5 to 12, inclusive.

It is one of the objects of this invention to produce dies so shaped as to form the lower side of the bit, shank, and bow, but to only partly form the upper side of the shank, leaving the upper side of the bit and bow unformed.

A further object of the invention is to produce dies so shaped as to force the surplus metal outward laterally and permit it to flow freely.

A, A', or A² denotes a die in each of the forms illustrated, which for convenience I will term the "lower" die, and B, B', or B² the coacting die, which for convenience I will term the "upper" die.

Turning now to Figs. 1, 5, and 9, it will be noted that the die A, A', or A² is provided with a depression 20, in which the lower side of the key-shank is formed with a depression 21, in which the lower side of the bit is formed, and with a depression 22, in which the lower side of the bow is formed. For double-bitted keys depressions 21 are provided on opposite sides of depression 20, as clearly shown in Fig. 9. 23 denotes the normal surface of the face of said die, and 24 a slight central longitudinal depression, which is provided in order to insure ample clearance of surplus stock in use.

The upper die B, B', or B², as shown in Figs. 2, 6, and 10 is formed with a cavity 26, the bottom of which is depressed, as at 25. Said depression 25 when the two dies coact is opposite the depression 20 of the lower die and is of the contour of the shank portion of the key.

Referring particularly to the form shown in Figs. 5, 6, 7, and 8, it will be seen that the die A' is formed with a cavity comprising the portions 20, 21, and 22, which is the counterpart in intaglio of a portion of the key to be formed, said portions being adapted to completely outline the key on one side. The opposing die B' has sunk below the surface thereof a cavity which is the counterpart in intaglio of a portion only of the opposite side of the key-shank. The said die B' also has end walls and stop-faces which are raised above the surface in which the cavity is sunk and arranged to contact with the other die and limit the approach of the dies and the flow of the metal endwise, but to permit free lateral flow. In other words, the deeper portion 25 of the cavity in the die B' has the contour of the shank of the key and coacts with the depression 20 of the lower die A' in practically completing the shank of the key, which is the thickest portion of the article. The portion 26 of the cavity of the upper die B' permits all necessary lateral spreading of the metal, and the end X of the depression 25 constitutes the end wall, which coacts with the end y of the depression 20 of the lower die A' in preventing endwise spreading of the metal, thus forcing the latter to surely spread or flow laterally to a sufficient extent to completely follow the contour of the bit-forming depression 21 in the die A'. An important feature of construction is that cavity 26 is made shallowest contiguous to depression 25 and deepens outward toward the edges of the die, so that the fins formed in said cavity are thinnest at their inner edges—that is, where they join the shank and also at the center of the bow—and thicken outward laterally. In other words, in the inverted position, as in Figs. 2, 6, and 10, the bottoms of the cavities 26 incline downward and outward laterally, so that the recesses formed by cavities 26, the upper dies, and the coacting depressions in the lower dies, and which for convenience I will indicate by 27, (see Figs. 4, 8, and 12,) flare outward, thus providing ample space for the flow of surplus metal when forced outward laterally by the dies in use.

In the form illustrated in Figs. 9 to 12, inclusive, the central portion of cavity 26— that is, the portion contiguous to depression 25, in which the shank of the key-blank is formed—need not necessarily incline downward and outward. Whether the whole or a portion of this cavity 26 inclines downward and outward, so as to make the whole or only a portion of recess 27 flare outward, is a matter that will be determined largely by the size and style of the keys that are to be formed. 28 denotes a slight central longitudinal depression which corresponds with depression 24 in the lower die, the normal surface of the face of the die being indicated by 29.

In the form of dies illustrated in Figs. 1 to 4, inclusive, which, as already stated, is adapted to be used in connection with a blank which has been upset laterally at one end, as in Fig. 13, I provide in die B an additional depression 30, which is, in fact, a deepening of depression 28 contiguous to depression 25 and opposite to depression 26. The object of this additional depression is simply to insure ample space for the flow of surplus metal. As there is a relatively large amount of metal in the style of blank illustrated in Fig. 13 to be forced in one direction to form the bit, it follows that there must be something of a flow of metal in the opposite direction, which is provided for by depression 30.

Having thus described my invention, I claim—

A pair of key-blank-forming dies, one having a cavity the counterpart in intaglio of a portion of the key to be formed and adapted to completely outline it on one side; the opposing die having sunk below the surface thereof a cavity the counterpart in intaglio of a portion only of the opposite side of the key-shank, and having end walls and stop-faces, raised above the surface in which the cavity is sunk arranged to contact with the other die and limit the approach of the dies and the flow of metal endwise, but to permit free lateral flow, substantially as described.

In testimony whereof I affix my signature in presence of two witnesses.

LOUIS W. GATES.

Witnesses:
AGNES PRESCOTT OGDEN,
JENNIE LOUISE BROCKETT.